United States Patent
Qu et al.

(10) Patent No.: US 12,515,629 B2
(45) Date of Patent: Jan. 6, 2026

(54) ELECTRONIC PARKING BRAKING SYSTEM AND CONTROL METHOD THEREOF

(71) Applicants: Hyundai Motor Company, Seoul (KR); Kia Corporation, Seoul (KR)

(72) Inventors: Maolin Qu, Yantai (CN); Tao Xu, Yantai (CN); Young Jin Jo, Suwon-Si (KR); Wei Kang, Yantai (CN)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 66 days.

(21) Appl. No.: 18/533,523

(22) Filed: Dec. 8, 2023

(65) Prior Publication Data
US 2025/0018913 A1 Jan. 16, 2025

(30) Foreign Application Priority Data
Jul. 11, 2023 (CN) .......................... 202310848822.4

(51) Int. Cl.
 *B60T 8/92* (2006.01)
 *B60T 1/06* (2006.01)
 (Continued)

(52) U.S. Cl.
 CPC ................ *B60T 8/92* (2013.01); *B60T 1/065* (2013.01); *B60T 7/085* (2013.01); *B60T 7/12* (2013.01);
 (Continued)

(58) Field of Classification Search
 CPC ............ B60T 8/92; B60T 1/065; B60T 7/085; B60T 7/12; B60T 8/885; B60T 17/22;
 (Continued)

(56) References Cited

U.S. PATENT DOCUMENTS

| | | | |
|---|---|---|---|
| 10,875,511 B2 | 12/2020 | Vandenberg, III et al. | |
| 2022/0340112 A1 | 10/2022 | Kim | |
| 2024/0140381 A1* | 5/2024 | Youn ..................... | B60T 13/148 |

FOREIGN PATENT DOCUMENTS

KR          10-2446142 B1     9/2022

* cited by examiner

*Primary Examiner* — Jacob M Amick
(74) *Attorney, Agent, or Firm* — Morgan Lewis & Bockius LLP

(57) ABSTRACT

In an electronic parking braking system and a control method thereof, the system includes a transmission apparatus, a main parking braking controller and an auxiliary parking braking controller. The transmission apparatus sends a parking request signal when a parking (P) stage is input. The main parking braking controller determines whether being capable of performing a main parking braking control upon receiving the parking request signal, performs the main parking braking control upon determining that the main parking braking controller can perform the main parking braking control, and sends a failure signal to the transmission apparatus upon determining that the main parking braking controller cannot perform the main parking braking control. When the transmission apparatus receives the failure signal, the auxiliary parking braking controller may perform an auxiliary parking braking control. The auxiliary parking braking controller performs an auxiliary parking braking control based on the parking request signal in an activation state.

18 Claims, 12 Drawing Sheets

(51) Int. Cl.
*B60T 7/08* (2006.01)
*B60T 7/12* (2006.01)
*B60T 8/88* (2006.01)
*B60T 17/22* (2006.01)
*F16H 59/12* (2006.01)

(52) U.S. Cl.
CPC .............. *B60T 8/885* (2013.01); *B60T 17/22* (2013.01); *F16H 59/12* (2013.01); *B60T 2220/04* (2013.01); *B60T 2250/00* (2013.01)

(58) Field of Classification Search
CPC ............. B60T 2220/04; B60T 2250/00; B60T 7/045; F16H 59/12
See application file for complete search history.

FIG. 6

| Failure assembly | EPB control authority | Remarks |
|---|---|---|
| EPB motor circuit | MAIN EPB | Failure phenomenon: ①Motor power source line disconnection; ②Motor current sensor failure; ③Motor inverter FET (Field Effect Transistor) failure. FET state monitoring can be conducted in in main MCU, only normal channel (FET1 error + FET2 normal) or (FET2 normal + FET1 error) is manipulated. |
| Main MCU OFF | Auxiliary EPB | Failure Phenomenon: ①MCU error; ②ASIC error of main MCU□CAN time-out ③Motor driver IC error→failure signal (EPB_EmerModReq) == 0x1 emergent EPB mode request. Main MCU OFF state is monitored through can by auxiliary MCU. When signals from other controllers are normally received, EPB can be controlled by auxiliary MCU. |
| AUXILIARY MCU OFF | MAIN EPB | Main MCU can implement normal EPB control. |
| low voltage (LESS 9V) | MAIN EPB | (Battery1 ERROR + battery2 ERROR 1) or (Battery2 ERROR + battery1 ERROR) Main MCU manipulates only normal channel. |
| high voltage (MORE THAN 16 V) | MAIN EPB | (Battery1 ERROR + battery2 ERROR 1) or (battery2 ERROR + battery1 ERROR) Main MCU manipulates only normal channel. |
| EPB switch | MAIN EPB | Automatic application/release is possible EPB is possible to control both |
| CAN1 | MAIN EPB | Main MCU can implement normal EPB control. |
| CAN2 | MAIN EPB | Can problem → main MCU communication failure indication CAN1 →Main MCU control maintained→ Determine whether operation of auxiliary MCU is normal by using mode(mode) switch |

ELECTRONIC PARKING BRAKING SYSTEM AND CONTROL METHOD THEREOF

CROSS-REFERENCE TO RELATED APPLICATION

The present application claims priority to and the benefit of Chinese Patent Application No. 202310848822.4 filed in the Chinese National Intellectual Property Administration on Jul. 11, 2023, the entire contents of which are incorporated herein by reference.

BACKGROUND OF THE PRESENT DISCLOSURE

Field of the Present Disclosure

The present disclosure relates to a vehicle control technology field, and in particular, to an electronic parking braking system and a control method thereof.

Description of Related Art

A vehicle provides one or more driving states by use of a transmission system. The transmission system includes a transmission box, and the transmission box adopts various gears and gear trains to convert a torque of a rotational power source. In an automatic transmission system, the transmission box generally includes a parking pawl, and the parking pawl is selectively coupled to a notch gear to fix the gear train. Accordingly, the vehicle is parked. When a driver manipulates a shift lever from a D stage or a reverse (R) stage to a parking (P) stage, the parking pawl is coupled to one notch in the notch gear.

With the supply of electric vehicles, an electronic parking brake (EPB) integrates a temporary braking function while driving and a long-time braking function after parking, and implements parking braking through an electronic control, and the use of the EPB is increasingly extensive. However, as the degree of electronification is improved, some problems are also occurring. For example, if an EPB electronic control unit (ECU) breaks down in a vehicle's driving process, the braking function cannot be executed, which can cause serious accidents.

Currently, some vehicle manufacturers provide two EPB ECUs to implement safety protection of P-stage parking. However, if one EPB ECU breaks down, a preliminary EPB ECU can only be used once, which cannot guarantee the failure safety of the EPB system. Furthermore, some vehicle manufacturers additionally add the EPB ECUs and relays, which increases hardware costs and increases a volume of the EPB system. Therefore, an electronic parking braking system and a control method thereof that guarantee the failure stability of the EPB system and do not significantly increase the hardware costs are desperately needed.

The information included in this Background in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing an electronic parking braking system and a control method thereof that guarantees, when a failure occurs in a control of any one path, the other one path to still provide a parking braking function by dualizing some members of an EPB. Accordingly, a driver can perform safe parking.

An exemplary embodiment of the present disclosure provides an electronic parking braking system. The system includes a transmission apparatus, a main parking braking controller, and an auxiliary parking braking controller. The transmission apparatus is configured to send a parking request signal when a parking (P) stage is input. The main parking braking controller is configured to determine whether being capable of performing a main parking braking control upon receiving the parking request signal from the transmission apparatus, perform the main parking braking control upon determining that the main parking braking controller is capable of performing the main parking braking control, and send a failure signal to the transmission apparatus upon determining that the main parking braking controller is not capable of performing the main parking braking control. The auxiliary parking braking controller is configured to perform an auxiliary parking braking control based on the parking request signal received from the transmission apparatus in an activation state. The transmission apparatus is configured to activate the auxiliary parking braking controller so that the auxiliary parking braking controller is configured to perform the auxiliary parking braking control upon receiving the failure signal from the main parking braking controller.

The transmission apparatus may include a shift stage button and a vehicle control unit. The shift stage button is configured to input a shift stage by manipulation of a driver. The vehicle control unit is configured to request a shift control of a vehicle based on the shift stage input into the shift stage button to send a shift request signal.

The main parking braking controller is configured to perform the main parking braking control by controlling operations of first and second calipers upon determining that the main parking braking control is capable of being performed, and send a feedback signal indicating states of the first and second calipers to the vehicle control unit when the main parking braking control is completed.

The vehicle control unit may be configured to send the activation signal to the auxiliary parking braking controller to activate the auxiliary parking braking controller upon receiving the failure signal from the main parking braking controller, and send the parking request signal to the auxiliary parking braking controller upon determining that the auxiliary parking braking controller is in the activation state.

The auxiliary parking braking controller may be configured to switch the auxiliary parking braking controller from a deactivation state to the activation state upon receiving the activation signal from the vehicle control unit, and send, to the vehicle control unit, an activation state signal indicating that the auxiliary parking braking controller is in the activation state so that the vehicle control unit is configured to determine that the auxiliary parking braking controller is in the activation state based on the received activation state signal.

The auxiliary parking braking controller may be configured to perform the auxiliary parking braking control by controlling the operation of one caliper upon receiving the parking request signal from the vehicle control unit in the activation state, and send a feedback signal indicating a state of the one caliper to the vehicle control unit when the auxiliary parking braking control is completed.

The main parking braking controller may be electrically connected to the vehicle control unit through a first communication channel and a second communication channel, and the auxiliary parking braking controller is electrically connected to the vehicle control unit through the first communication channel and the second communication channel, and When a communication failure occurs in the first communication channel, communication between the main parking braking controller and the vehicle control unit and communication between the auxiliary parking braking controller and the vehicle control unit may be implemented through the second communication channel.

The first communication channel may include a first CAN local network of a CAN network; and the second communication channel may include a second CAN local network, a third CAN local network and a CGW of the CAN network.

The electronic parking braking system may further include an EPB switch configured to input an electronic parking signal by the manipulation of the driver, and the main parking braking controller may be configured to perform the main parking braking control by controlling operations of first and second calipers upon receiving the electronic parking signal input from the EPB switch.

The main parking braking controller and the auxiliary parking braking controller may be provided in the same control apparatus.

The main parking braking controller and the auxiliary parking braking controller may be provided in different control apparatuses.

Another exemplary embodiment of the present disclosure provides a control method of an electronic parking braking system, and the electronic parking braking system includes a shift stage button, a vehicle control unit, a main parking braking controller, and an auxiliary parking braking controller. The control method may include sending, by the vehicle control unit, a parking request signal when a parking (P) stage is input into the shift stage button: determining, by the main parking braking controller, whether being capable of performing a main parking braking control upon receiving the parking request signal from the vehicle control unit, and sending, to the vehicle control unit, a failure signal upon determining that the main parking braking controller is not capable of performing the main parking braking control: activating, by the vehicle control unit, the auxiliary parking braking controller upon receiving the failure signal from the main parking braking controller; and performing, by the auxiliary parking braking controller, an auxiliary parking braking control upon receiving the parking request signal from the vehicle control unit in an activation state.

The control method may further include performing, by the main parking braking controller, the main parking braking control by controlling operations of first and second calipers upon determining that the main parking braking control is capable of being performed; and sending, by the main parking braking controller, a feedback signal indicating states of the first and second calipers to the vehicle control unit when the main parking braking control is completed.

The control method may further include sending, by the vehicle control unit, the activation signal to the auxiliary parking braking controller to activate the auxiliary parking braking controller upon receiving the failure signal from the main parking braking controller: switching, by the auxiliary parking braking controller, from a deactivation state to the activation state upon receiving the activation signal from the vehicle control unit, and sending, to the vehicle control unit, an activation state signal indicating that the auxiliary parking braking controller is in the activation state; and determining, by the vehicle control unit, that the auxiliary parking braking controller is in the activation state based on the received activation state signal, and sending, to the auxiliary parking braking controller, the parking request signal upon determining that the auxiliary parking braking controller is in the activation state.

The control method may further include performing, by the auxiliary parking braking controller, an auxiliary parking braking control upon receiving the parking request signal from the vehicle control unit in the activation state by controlling an operation of one caliper; and sending, by the auxiliary parking braking controller, a feedback signal indicating a state of the one caliper to the vehicle control unit when the auxiliary parking braking control is completed.

The main parking braking controller may be electrically connected to the vehicle control unit through a first communication channel and a second communication channel, and the auxiliary parking braking controller may be electrically connected to the vehicle control unit through the first communication channel and the second communication channel. When a communication failure occurs in the first communication channel, communication between the main parking braking controller and the vehicle control unit and communication between the auxiliary parking braking controller and the vehicle control unit may be implemented through the second communication channel.

The first communication channel may include a first CAN local network of a CAN network, and the second communication channel may include a second CAN local network, a third CAN local network and a CGW of the CAN network.

The electronic parking braking system may further include an EPB switch, and the control method may further include receiving an electronic parking signal by manipulation of a driver through the EPB switch; and performing, by the main parking braking controller, the main parking braking control by controlling operations of first and second calipers in response to receiving the electronic parking signal from the EPB switch.

The main parking braking controller and the auxiliary parking braking controller may be provided in the same control apparatus.

The main parking braking controller and the auxiliary parking braking controller may be provided in different control apparatuses.

The present disclosure adopts the technical method and includes the following beneficial effects.

According to exemplary embodiments of the present disclosure, a transmission parking configuration according to the related art is omitted, and controller dualization is implemented by use of a main parking braking controller and an auxiliary parking braking controller. When the main parking braking controller breaks down, a vehicle control unit activates the auxiliary parking braking controller to send a parking request to the auxiliary parking braking controller. Subsequently, the auxiliary parking braking controller is configured to control a caliper mounted on a driving wheel to realize the parking safety when the main parking braking controller is broken down.

Furthermore, both the main parking braking controller and the auxiliary parking braking controller are connected to a first communication channel and a second communication channel to implement CAN communication dualization. When the first communication channel is broken, the second communication channel normally sends a message. Accordingly, the parking safety when a communication line is broken is implemented.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

BRIEF DESCRIPTION OF THE DRAWINGS

Hereinafter, various exemplary embodiments of the present disclosure will be described with reference to the drawings. For a clear explanation, the same member in different drawings is represented by the same reference numeral. With respect to a point to be described, the drawings are just exemplary, and elements to be described are not drawn according to a ratio.

FIG. 6 is a table illustrating a failure safety measure when different types of failures occur in an EPB.

Figure 1:
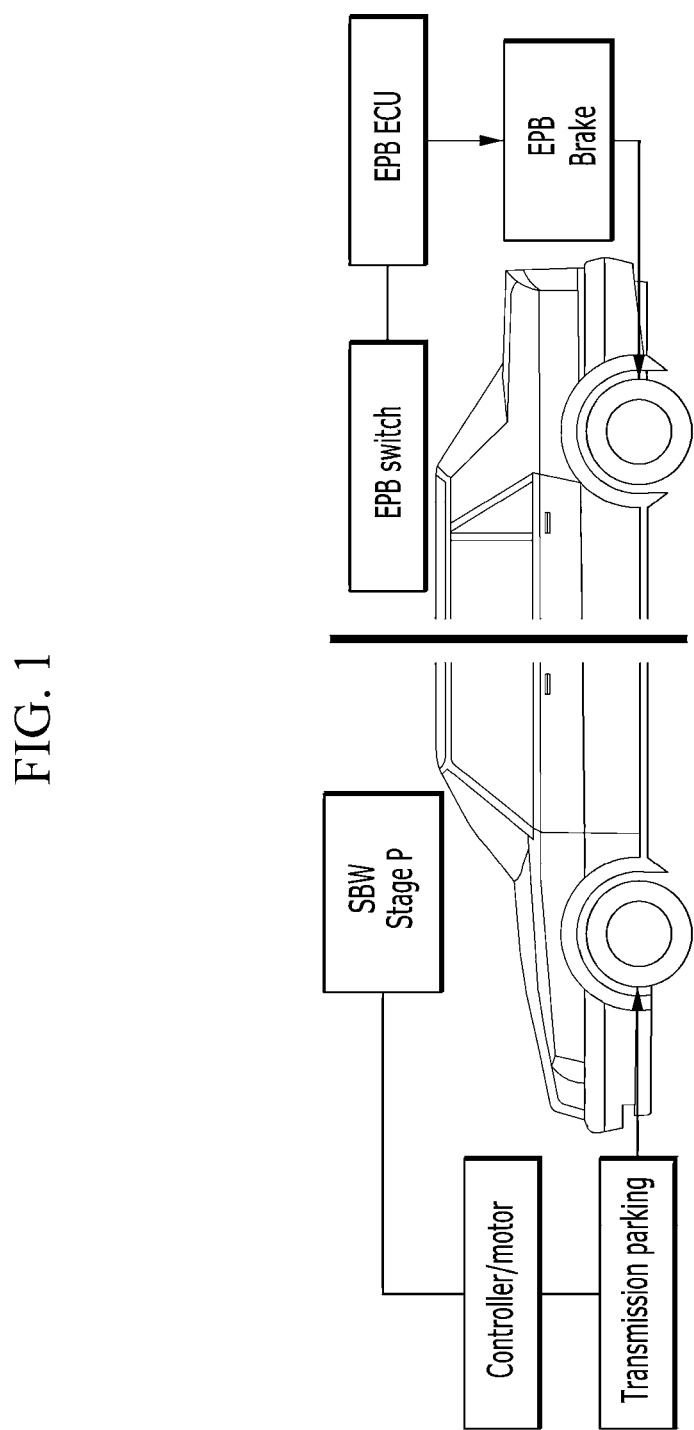
FIG. 1 schematically illustrates two types of parking systems according to related art.

It may be understood that the appended drawings are not necessarily to scale, presenting a somewhat simplified representation of various features illustrative of the basic principles of the present disclosure. The predetermined design features of the present disclosure as included herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, an exemplary embodiment of the present disclosure will be described in detail, and the exemplary embodiment of the present disclosure will be conducted on the premise of the technical measure of the present disclosure, and a detailed implementation method and a specific operation process are presented, but the protection scope of the present disclosure is limited to the following exemplary embodiment of the present disclosure.

FIG. 1 schematically illustrates two types of electronic parking systems according to related art. As illustrated in FIG. 1, in an electronic parking system of a vehicle according to the related art illustrated at a left side of FIG. 1, when a parking (P) stage is input into a shift by wire (SBW) system, a controller of a transmission is configured to perform a parking function by manipulating a transmission parking mechanism. In another electronic parking system of the vehicle according to the related art illustrated at a right side of FIG. 1, when a parking control of the vehicle is requested by pressing an electrical parking brake (EPB) switch, an EPB electronic control unit (ECU) manipulates a brake mounted on a driving wheel so that a brake becomes a parking braking state.

However, in the electronic parking braking system according to an exemplary embodiment of the present disclosure, a transmission parking configuration according to the related art may be omitted, and when the EPB ECU is broken, a problem of the related art in which a parking function may not be implemented is solved.

Figure 2:
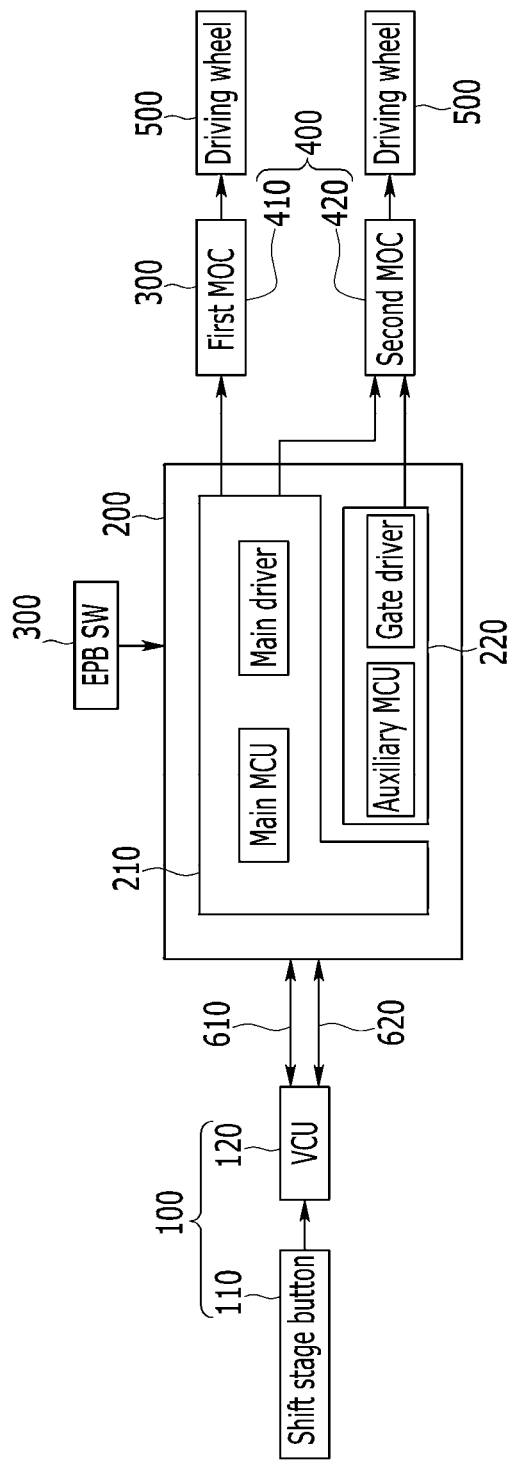
FIG. 2 is a block diagram of an electronic parking braking system according to an exemplary embodiment of the present disclosure.

A configuration of the electronic parking braking system will be described in detail with reference to FIG. 2. FIG. 2 is a block diagram of an electronic parking braking system according to an exemplary embodiment of the present disclosure. As illustrated in FIG. 2, the electronic parking braking system may include a transmission apparatus 100, a main parking braking controller 210, an auxiliary parking braking controller 220, an EPB switch (SW) 300, a caliper 400, and a driving wheel 500.

When the P stage is input by the manipulation of the driver, the transmission apparatus 100 requests the parking control of the vehicle. In various exemplary embodiments of the present disclosure, the transmission apparatus 100 may include a shift input device 100 and a vehicle control unit (VCU) 120. The shift input device 110 may use a button-type control such as a shift stage button, but the present disclosure is not limited thereto. The driver manipulates the shift stage button to input the P stage, an R stage, an N stage, or a D stage. The VCU 120 may request the shift control of the vehicle based on the shift stage input by the shift stage button.

The VCU 120 may be electrically connected to the main parking braking controller 210 and the auxiliary parking braking controller 220, respectively. The main parking braking controller 210 may perform a main parking braking control based on a parking request signal received from the VCU 120. Upon receiving the parking request signal from the VCU 120, the main parking braking controller 210 may be configured to determine whether the main parking braking controller 210 can perform the main parking braking control, and send, to the VCU 120, a failure signal upon determining that the main parking braking controller 210 cannot perform the main parking braking control. The auxiliary parking braking controller 220 may perform an auxiliary parking braking control based on the parking request signal received from the VCU 120 in an activation state. When the VCU 120 receives the failure signal from the main parking braking controller 210, the VCU 120 may be configured to activate the auxiliary parking braking controller 220 so that the auxiliary parking braking controller 220 is configured to perform the auxiliary parking braking control.

Accordingly, according to an exemplary embodiment of the present disclosure, the VCU 120 may directly request the parking control of the vehicle to the main parking braking controller 210 and the auxiliary parking braking controller 220 without passing through the transmission parking configuration according to the related art. Furthermore, the electronic parking braking system includes the auxiliary parking braking controller 220 to provide a redundancy configuration to the EPB ECU, and when the main parking braking controller (i.e., EPB ECU) 210 is broken, it is guaranteed that the auxiliary parking braking controller 220 may still provide the parking braking function. Accordingly, the safe parking is guaranteed.

When the main parking braking controller 210 receives the parking request signal from the VCU 120, the main parking braking controller 210 may be configured to determine whether the main parking braking controller 210 can perform the parking braking control. When the main parking braking controller 210 determines that the main parking braking controller 210 can perform the main parking braking control, the main parking braking controller 210 may perform the main parking braking control by controlling operations of both calipers 400. When the main parking braking control is completed, the main parking braking controller 210 sends a feedback signal indicating states of both the calipers to the VCU 120.

When the main parking braking controller 210 determines that the main parking braking controller 210 cannot perform the main parking braking control, the main parking braking controller 210 may send the failure signal to the VCU 120. When the VCU 120 receives the failure signal from the main parking braking controller 210, the VCU 120 may send an activation signal to the auxiliary parking braking controller 220 to activate the auxiliary parking braking controller 220.

When the auxiliary parking braking controller 220 receives the activation signal from the VCU 120, the auxiliary parking braking controller 220 may be switched from a deactivation state to the activation state, and may send an activation state signal to the VCU 120. The activation state signal indicates that the auxiliary parking braking controller 220 is in the activation state.

The VCU 120 may be configured to determine that the auxiliary parking braking controller 220 is in the activation state based on the received activation state signal. When the VCU 120 determines that the auxiliary parking braking controller 220 is in the activation state, the VCU 120 may send the parking control signal to the auxiliary parking braking controller 220.

When the auxiliary parking braking controller 220 receives the parking request signal from the VCU 120 in the activation state, the auxiliary parking braking controller 220 is configured to perform the auxiliary parking braking control by controlling the operation of one caliper. When the auxiliary parking braking control is completed, the auxiliary parking braking controller 220 may sends a feedback signal indicating a state of the one caliper to the VCU 120.

According to an exemplary embodiment of the present disclosure, the main parking braking controller 210 may include a main microcontroller unit (MCU) and a main driver. The main MCU is used for generating a control signal and sending the control signal to the main driver, and the main driver operates based on the received control signal. Similarly, the auxiliary parking braking controller 220 may include an auxiliary MCU and an auxiliary driver.

According to an exemplary embodiment of the present disclosure, the main parking braking controller 210 and the auxiliary parking braking controller 220 may be integrated into the same control device, for example, an integrated electric brake (IEB) 200, or integrated into different control devices, for example, the main parking braking controller may be integrated into the IEB and the auxiliary parking braking controller may be integrated into an integrated control unit (ICU). When the main parking braking controller 210 and the auxiliary parking braking controller 220 are integrated into the same control device, the electronic parking braking system may be implemented at a lower cost. When the main parking braking controller 210 and the auxiliary parking braking controller 220 are integrated into different control devices, a protection measure is provided to a connector error (i.e., error safety assurance is added) to improve the reliability of the electronic parking braking system.

The caliper 400 includes a first motor on caliper (MOC) 410 and a second MOC 420. The first MOC 410 and the second MOC 420 are mounted on two driving wheels 500 of the vehicle and connected to the IEB 200. The main parking braking controller 210 is connected to the first MOC 410 and the second MOC 420, respectively. When the main parking braking controller 210 receives a parking control request, the main parking braking controller 210 may manipulate the first MOC 410 and the second MOC 420 so that the first MOC 410 and the second MOC 420 are in the parking braking state. The auxiliary parking braking controller 220 is connected only to the second MOC 420. When the auxiliary parking braking controller 220 receives the parking control request in the activation state, the auxiliary parking braking controller 220 may manipulate only the second MOC 420. The first MOC 410 and the second MOC 420 may be mounted on both rear wheels, but the present disclosure is not limited thereto, and may be mounted on front wheels of the vehicle according to a vehicle type. For example, the first MOC may be mounted on a right rear wheel, and the second MOC may be mounted on a left rear wheel.

Each of the first MOC 410 and the second MOC 420 may be configured so that a rotation power of the motor is converted into a translation motion through a lead screw nut during the parking control, and two braking pads apply pressure to a braking disk to generate braking force. Each of the first MOC 410 and the second MOC 420 may be configured to release braking disk pressure by a motor control opposite to the motor control during the parking braking.

Except the shift input device 110 inputs the P stage to request the parking control of the vehicle, the EPB switch 300 may input an electronic parking signal by the manipulation of the driver. When the electronic parking signal of the EPB switch 300 is input, the main parking braking controller 210 may perform the main parking braking control by controlling the operations of both the calipers 400. That is, to control the vehicle in the parking braking state, the main parking braking controller 210 manipulates the first MOC 410 and the second MOC 420 mounted on the driving wheel. However, the EPB switch 300 cannot manipulate the auxiliary parking braking controller 220.

Figure 3:
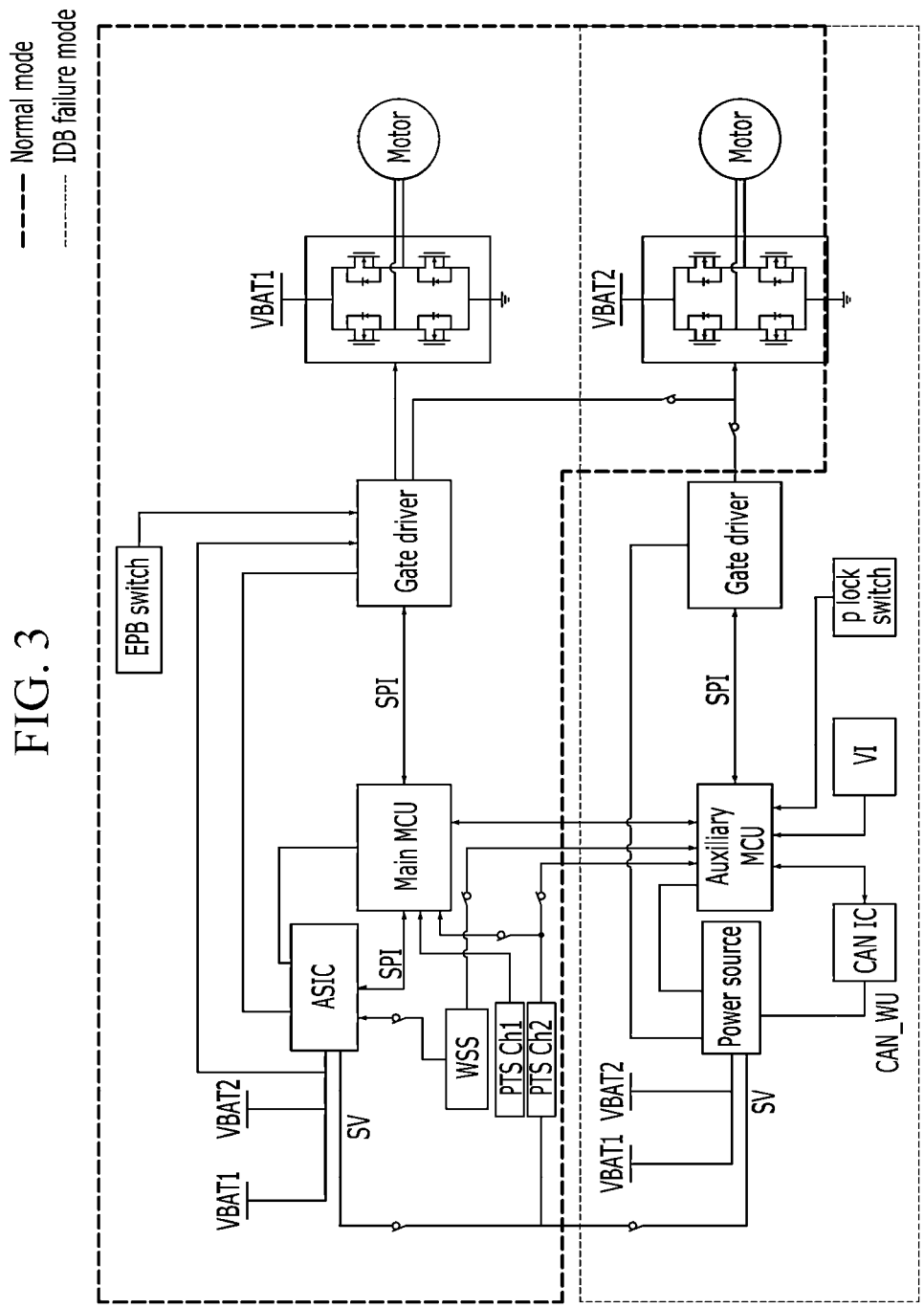
FIG. 3 is a detailed structural diagram of an EPB according to an exemplary embodiment of the present disclosure.

FIG. 3 is a detailed structural diagram of an IEB according to an exemplary embodiment of the present disclosure. As illustrated in FIG. 3, the redundancy configuration for the EPB ECU (or MCU) is provided to guarantee the auxiliary parking braking controller to still provide the parking braking function when the main parking braking controller (i.e., EPB ECU) is broken. Additionally, redundancy of other members may also be configured in the IEB. For example, power source redundancy may be configured in the IEB, and that is, the IEB includes a first power source VBAT1 and a second power source VBAT2. Furthermore, redundancy of a wheel speed sensor (WSS) of the rear wheel may also be configured.

In one example, the main parking braking controller may be mounted in an integrated dynamic brake (IDB), and the IDB is constructed by integrating an anti-lock brake system (ABS) and an electric stability control (ESC). The IDB may implement miniaturization and weight-reduction of the braking system.

The electronic parking braking system according to an exemplary embodiment of the present disclosure may operate in a normal mode (i.e., a case where the main parking braking controller is in a normal state) and an IDB failure mode (i.e., a case where the main parking braking controller is broken).

In the normal mode, two MOCs (i.e., the first MOC and the second MOC) mounted on each of both the rear wheels may be manipulated by the IDB and the EPB switches. When a parking signal of the EPB switch is input, the IDB manipulate the two MOCs to control the vehicle in the parking braking state.

In the IDB failure mode, the auxiliary parking braking controller is configured to control only the MOC mounted on one rear wheel (e.g., the left side). The VCU may activate the auxiliary parking braking controller, and send the received parking request signal to the auxiliary parking braking controller. The auxiliary parking braking controller can make the left MOC in the parking braking state based on the received parking braking request signal.

Referring back to FIG. 2, according to an exemplary embodiment of the present disclosure, the IEB 200 and the VCU 120 may communicate through a first communication channel 610 and a second communication channel 620. The main parking braking controller 210 is electrically connected to the VCU 120 through the first communication channel 610 and the second communication channel 620, and the auxiliary parking braking controller 220 is electrically connected to the VCU 120 through the first communication channel 610 and the second communication channel 620. When a communication failure occurs in the first communication channel 610, the communication between the main parking braking controller 210 and the VCU 120, and the communication between the auxiliary parking braking controller 220 and the VCU 120 may be implemented through the second communication channel 620.

Figure 4A:
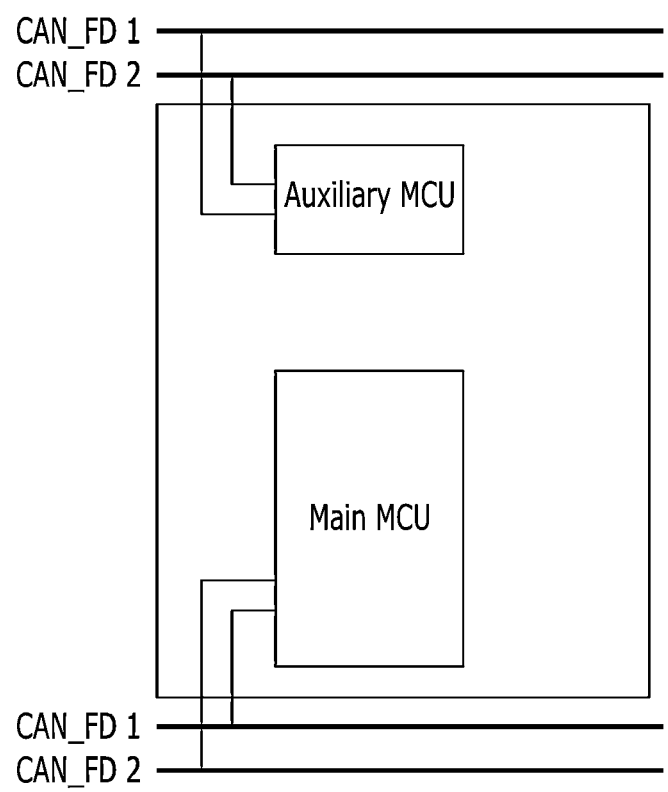
FIG. 4A and FIG. 4B are schematic views exemplarily illustrating a connection mode between a main parking braking controller, an auxiliary parking braking controller, a first communication channel, and a second communication channel according to an exemplary embodiment of the present disclosure.
Figure 4B:
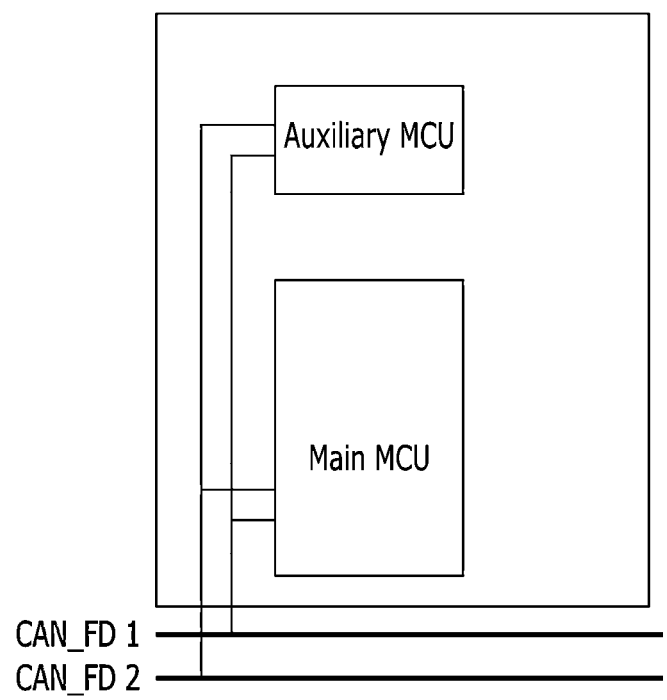

Referring to FIG. 4A and FIG. 4B, a connection mode between the main parking braking controller, the auxiliary parking braking controller, the first communication channel, and the second communication channel according to an exemplary embodiment of the present disclosure will be described in detail. The first communication channel and the second communication channel may be a communication channel based on a Controller Area Network (CAN) or a controller area network with flexible data rate (CAN_FD).

Referring to FIG. 4A and FIG. 4B, CAN_FD 1 may be used as a communication network of the first communication channel, and CAN_FD 2 may be used as a communication network of the second communication channel, but the present disclosure is not limited thereto. As illustrated in FIG. 4A, the main MCU included in the main parking braking controller may be connected to CAN_FD 1 and CAN_FD 2, respectively, and the auxiliary MCU included in the auxiliary parking braking controller may be connected to CAN_FD 1 and CAN_FD 2, respectively. Unlike the connection mode illustrated in FIG. 4A, in a connection mode illustrated in FIG. 4B, the number of pins is reduced to reduce a demand for the CAN controller.

According to an exemplary embodiment of the present disclosure, the first communication channel may include a first CAN local network CAN1 of the CAN network, and the second communication channel may include a second CAN local network CAN2, a third CAN local network CAN3, and a center gateway CGW of the CAN network. For example, the first CAN local network CAN1 may be a first powertrain apparatus CAN local network, the second CAN local network CAN2 may be a chassis control CAN local network, the third CAN local network CAN3 may be a second powertrain apparatus CAN local network, and the CGW may be used for transferring signals between respective CAN local networks to implement mutual connections between the local networks.

Figure 5:
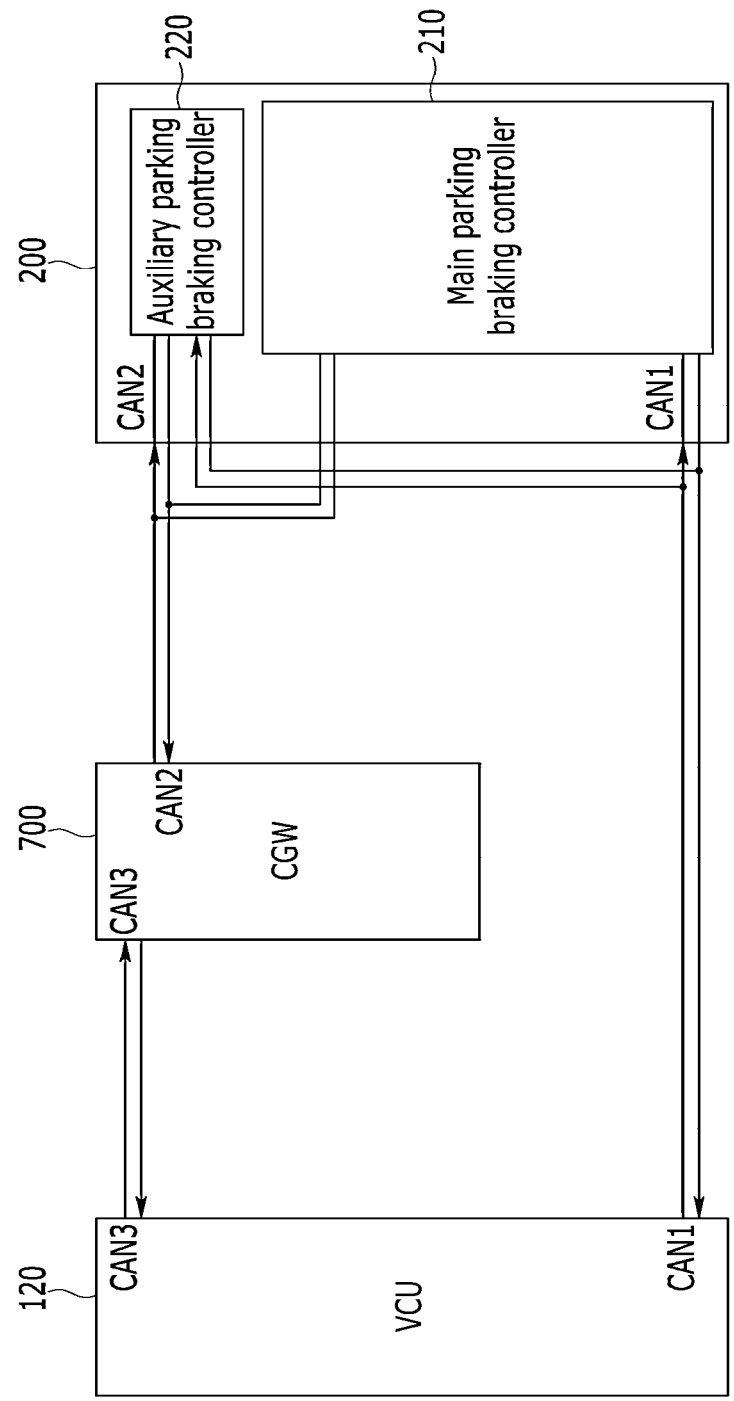
FIG. 5 is a schematic view exemplarily illustrating a communication mode between a vehicle control unit, a CGW, a main parking braking controller, and an auxiliary parking braking controller according to an exemplary embodiment of the present disclosure.

FIG. 5 is a schematic view exemplarily illustrating a communication mode between a VCU, a CGW, a main parking braking controller, and an auxiliary parking braking controller according to an exemplary embodiment of the present disclosure. As illustrated in FIG. 5, the VCU 120 is connected respectively to the main parking braking controller 210 and the auxiliary parking braking controller 220 through the first CAN local network CAN1 to form the first communication channel. The VCU 120 is connected to the CGW 700 through the third CAN local network CAN3, and the CGW 700 is connected respectively to the main parking braking controller 210 and the auxiliary parking braking controller 220 through the second CAN local network CAN2 to form the second communication channel.

FIG. 6 is a table illustrating a failure safety measure when different types of failures occur in an EPB. As illustrated in FIG. 6, when the failure occurs in the main MCU, the auxiliary MCU includes a control authority of the EPB so that the braking can operate normally: When the failure occurs in the auxiliary MCU, a normal EPB control is still implemented by the main MCU. When the failure occurs in CAN1 which is the first communication channel, the main MCU may still implement the normal EPB control through the second communication channel. When the failure occurs in partial CAN2 which is the second communication channel, the main MCU may still implement the normal EPB control through the first communication channel.

FIG. 7A, FIG. 7B, FIG. 7C, and FIG. 7D are schematic views exemplarily illustrating signal transfer between respective members (i.e., the VCU 120, the CGW 700, the main parking braking controller 210, the auxiliary parking braking controller 220, the first MOC 410, and the second MOC 420) of an electronic parking braking system according to an exemplary embodiment of the present disclosure in different situations.

Figure 7A:
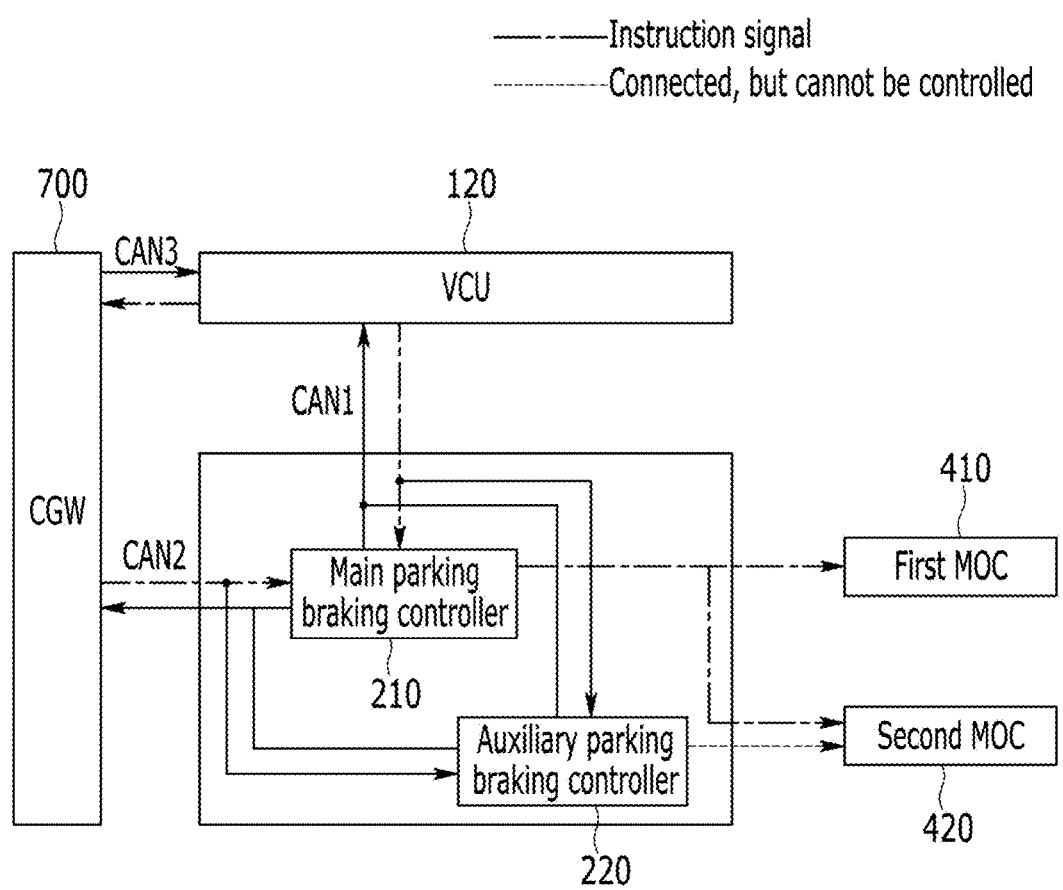
FIG. 7A, FIG. 7B, FIG. 7C, and FIG. 7D are schematic views exemplarily illustrating signal transfer between respective members of an electronic parking braking system according to an exemplary embodiment of the present disclosure in different situations.

FIG. 7A illustrates a signal transfer between the VCU 120, the CGW 700, the main parking braking controller 210, the auxiliary parking braking controller 220, the first MOC 410, and the second MOC 420 in a normal manipulation state. As illustrated in FIG. 7A, both the first MOC 410 and the second MOC 420 are controlled by the main parking braking controller 210. When the P stage is input by the manipulation of the driver, the VCU 120 sends the parking control request signal to the main parking braking controller 210 to fasten the first MOC 410 and the second MOC 420. When shifting stages other than the P stage are input by the manipulation of the driver, the VCU 120 sends a parking release request signal to the main parking braking controller 210 to release the first MOC 410 and the second MOC 420. The VCU 120 requests the parking control of the vehicle to the main parking braking controller 210 through the first CAN local network CAN1, and simultaneously, the VCU 120 requests the parking control of the vehicle to the main parking braking controller 210 through the third CAN local network CAN3, the CGW, and the second CAN local network CAN2 sequentially. This also implements bidirectional CAN communication between the VCU 120 and the main parking braking controller 210 to prevent a problem so that the parking request signal is not sent from the VCU 120 to the main parking braking controller 210 when the communication failure occurs only in the first CAN local network CAN1. In the instant case, the main parking braking controller 210 may send the feedback signals for the states of the first MOC 410 and the second MOC 420 to the VCU 120. The auxiliary parking braking controller 220 may send, to the VCU 120, a stand-by state signal in a stand-by (i.e., deactivation) state.

Figure 7B:
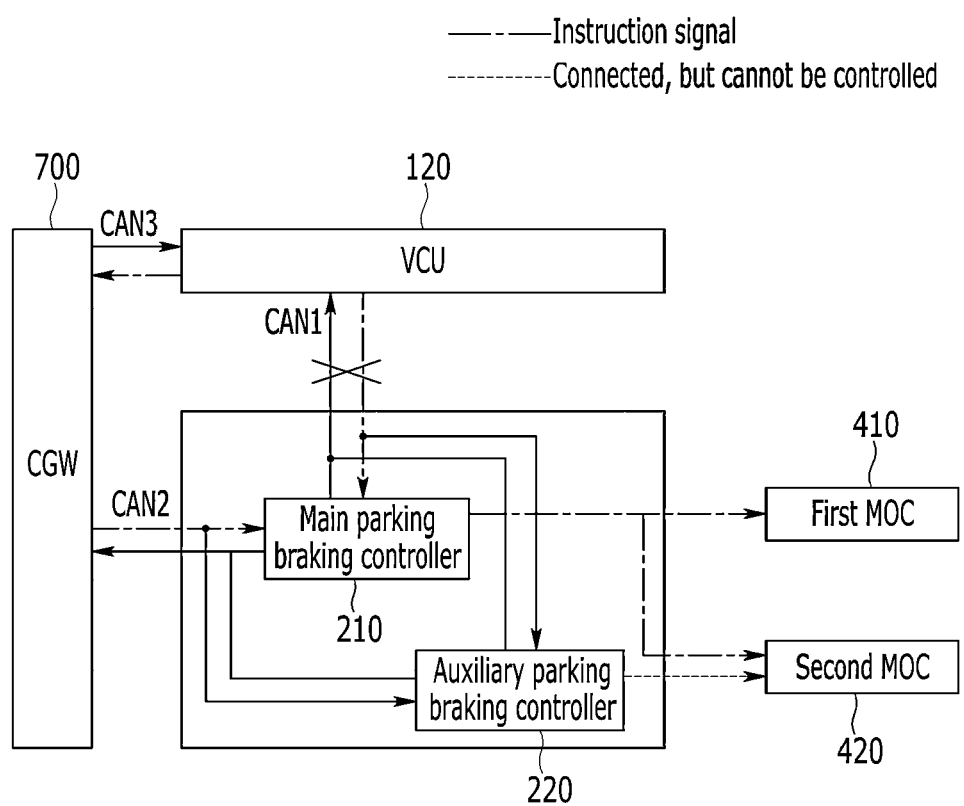

FIG. 7B illustrates a communication transfer between the VCU 120, the CGW 700, the main parking braking controller 210, the auxiliary parking braking controller 220, the first MOC 410, and the second MOC 420 in a state in which the communication failure occurs in the first CAN local network CAN1. As illustrated in FIG. 7B, if the second communication channel is provided, the main parking braking controller 210 may still control fastening or release of the first MOC 410 and the second MOC 420.

Figure 7C:
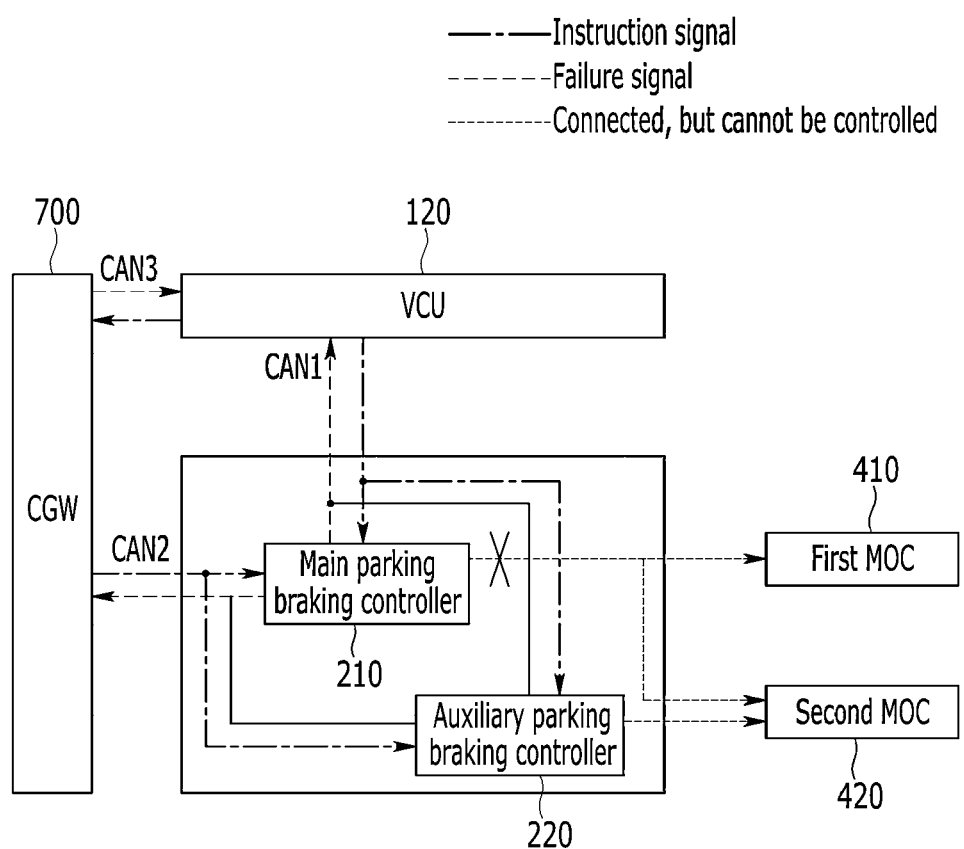

FIG. 7C illustrates a communication transfer between the VCU 120, the CGW 700, the main parking braking controller 210, the auxiliary parking braking controller 220, the first MOC 410, and the second MOC 420 in a state in which the failure occurs in the main parking braking controller 210. As illustrated in FIG. 7C, the failure occurs in the main parking braking controller 210, but the first communication channel and the second communication channel may still be used. An occurrence cause of such a situation may be that an error occurs in a drive integrated circuit (IC) included in the main parking braking controller 210.

In such a case, the main parking braking controller 210 cannot control the first MOC 410 and the second MOC 420. The main parking braking controller 210 may send, to the VCU 120, the failure signal through the first communication channel and/or the second communication channel. When the VCU 120 receives the failure signal from the main parking braking controller 210, the VCU 120 manipulates the second MOC 420 through the auxiliary parking braking controller 220. That is, the VCU 120 sends the activation signal to the auxiliary parking braking controller 220 to activate the auxiliary parking braking controller 220. The auxiliary parking braking controller 220 receives the parking request signal or the parking release request signal in the activation state, and then makes the second MOC 420 in the parking braking state or releases the second MOC 420) from the parking braking state. Furthermore, the auxiliary parking braking controller 220) may send the feedback signal for the state of the second MOC 420 to the VCU 120.

Figure 7D:
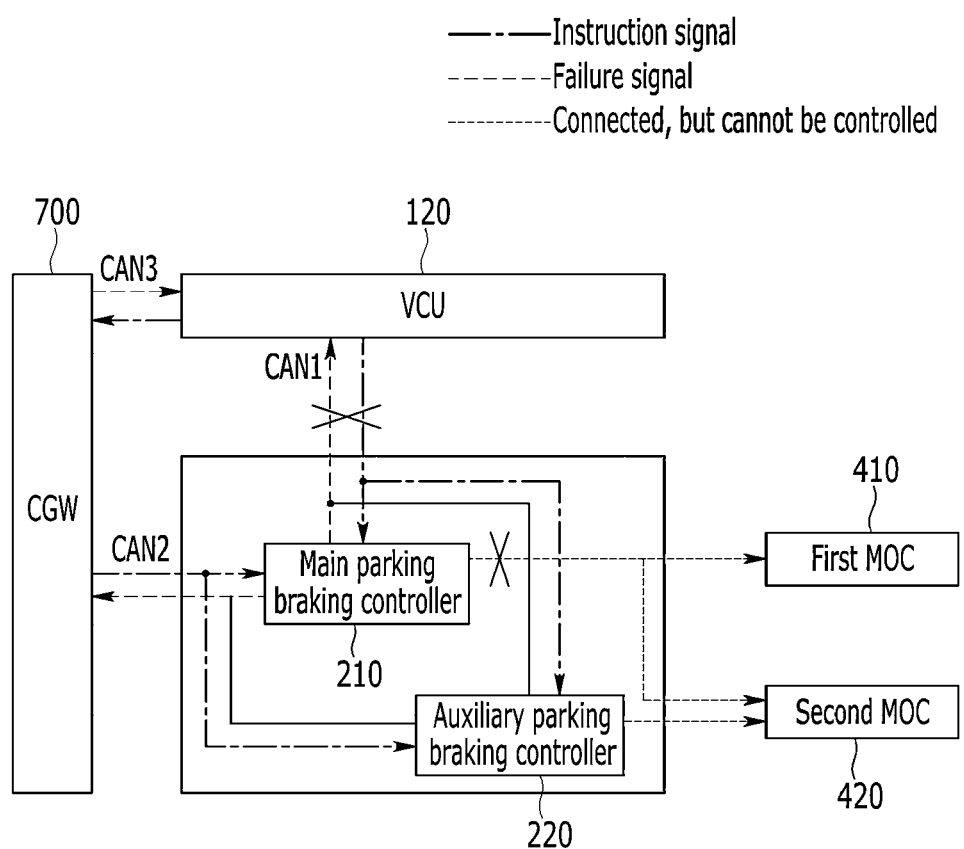

FIG. 7D illustrates a signal transfer between the VCU 120, the CGW 700, the main parking braking controller 210, the auxiliary parking braking controller 220, the first MOC 410, and the second MOC 420 in a state in which the failure occurs in both the main parking braking controller 210) and the first communication channel. As illustrated in FIG. 7D, the failure occurs in the main parking braking controller 210, and the first communication channel (i.e., the first CAN local network CAN1) cannot communicate. An occurrence cause of such a situation may be that the error occurs in the main MCU included in the main parking braking controller 210 or the error occurs in an application specific integrated circuit (ASIC) of the main MCU.

In such a case, the main parking braking controller 210 cannot control the first MOC 410 and the second MOC 420. When the communication between the main parking braking controller 210 and the first communication channel is time-out, the VCU 120 cannot receive the signal through the first communication channel within a predetermined time period. However, the main parking braking controller 210 may send the failure signal to the VCU 120 through the second communication channel (i.e., the third CAN local network, the second CAN local network, and the CGW). When the VCU 120 receives the failure signal from the main parking braking controller 210, the VCU 120 manipulates the second MOC 420 through the auxiliary parking braking controller. That is, the VCU 120 sends the parking request signal or the parking release request signal to the auxiliary parking braking controller 220 through the second communication channel to make the second MOC 420 in the parking braking state or release the second MOC 420 from the parking braking state. Furthermore, the auxiliary parking braking controller 220 may send a state signal for the state of the second MOC 420 to the VCU 120.

According to an exemplary embodiment of the present disclosure, the electronic parking braking system may further include a cluster, and the cluster may display, to the driver, information on the shift manipulation of the transmission apparatus. For example, the cluster may visually display shift stage information based on any one of the D stage, the R stage, the N stage, and the P stage of the transmission apparatus 100.

In one exemplary embodiment of the present disclosure, the cluster may be connected to the CGW. The CGW may connect the VCU, the IEB, and the cluster to each other by use of different heterogeneous communication protocols, and implement the CAN communication between the VCU, the IEB, and the cluster.

Figure 8:
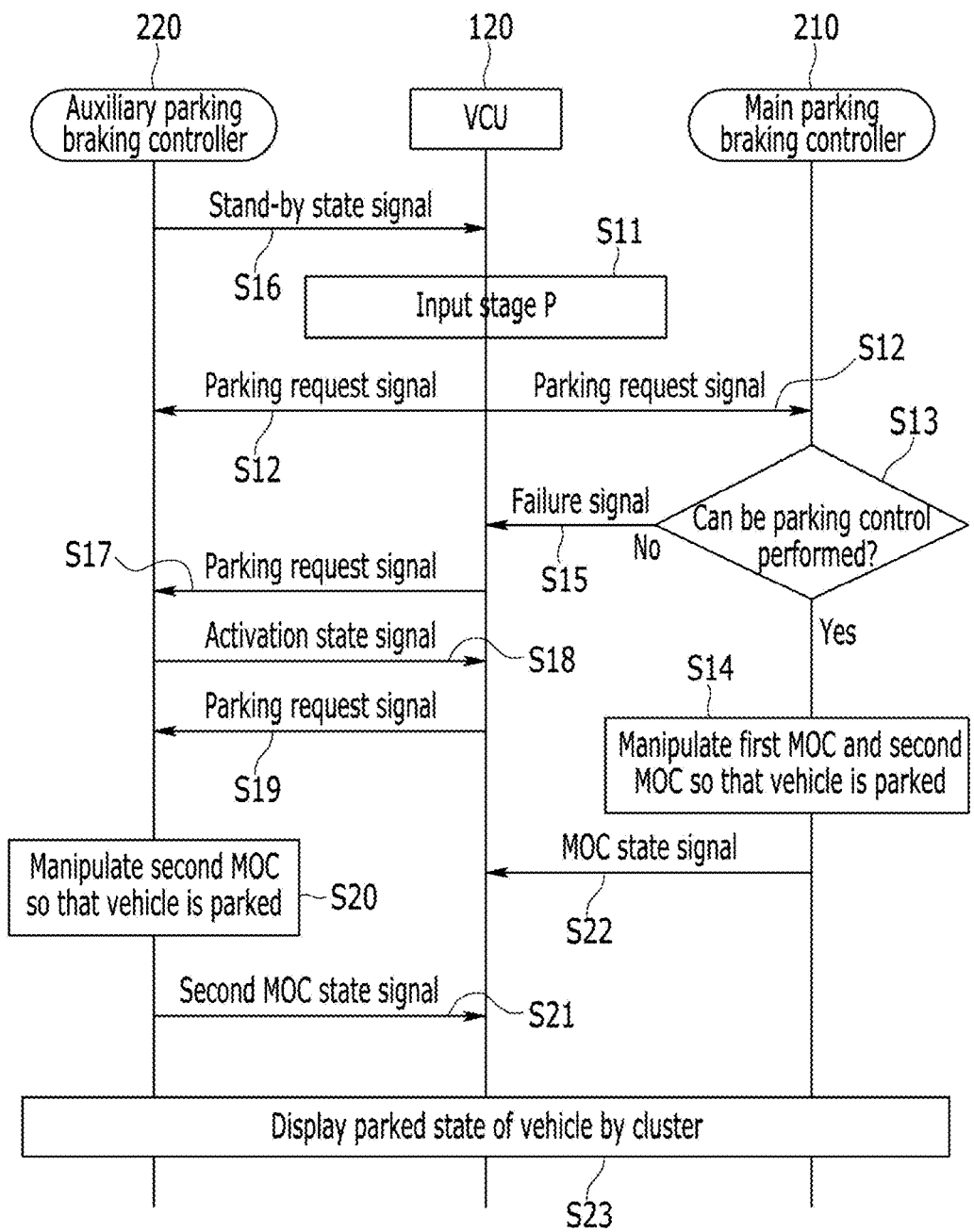
FIG. 8 is a flowchart illustrating a control method of an electronic parking braking system according to an exemplary embodiment of the present disclosure.

FIG. 8 is a flowchart illustrating a control method of an electronic parking braking system according to an exemplary embodiment of the present disclosure. As illustrated in FIG. 8, a control method between the VCU 120, the main parking braking controller 210, and the auxiliary parking braking controller 220 of the electronic braking system according to an exemplary embodiment of the present disclosure is illustrated.

When the auxiliary parking braking controller 220 is in the deactivation state, the auxiliary parking braking controller 220 may send, to the VCU 120, the stand-by state signal at step S16. The standby-state signal indicates that the auxiliary parking braking controller 220 is in the deactivation state.

When the P stage is input by manipulating the shift stage button (or shift lever) by the driver at step S11, the VCU 120 may request the parking control of the vehicle to the main parking braking controller 210 and the auxiliary parking braking controller 220 simultaneously, that is, sends the parking request signal at step S12. Because the auxiliary parking braking controller 220 is in the deactivation state, the auxiliary parking braking controller 220 does not respond to the parking request signal. When the main parking braking controller 210 receives the parking request signal from the VCU 120, the main parking braking controller 210 may be configured to determine whether the main parking braking controller 210 can perform the main parking braking control based on the vehicle parking request signal of the VCU 120 at step S13. When the main parking braking controller 210 can perform the main parking braking control ("yes" in the step S13), the main parking braking controller 210 manipulates the caliper mounted on the driving wheel so that the caliper is in the parking braking state. Because the caliper may include the first MOC and the second MOC mounted on two driving wheels of the vehicle, respectively, the main parking braking controller 210 may manipulate the first MOC and the second MOC so that the vehicle is parked at step S14. Furthermore, when the main parking braking controller 210 manipulates the first MOC and the second MOC, the main parking braking controller 210 may send, to the VCU 120, the fastening or releasing state of the first MOC and the second MOC at step S22.

When the main parking braking controller 210 cannot perform the main parking braking control based on the parking request signal of the vehicle of the VCU 120 ("no" in the step S13), the main parking braking controller 210 sends the failure signal to the VCU 120 at step S15. When the VCU 120 receives the failure signal from the main parking braking controller 210, the VCU 120 manipulates the caliper by activating the auxiliary parking braking controller 220. The VCU 120 sends the activation signal to the auxiliary parking braking controller 220 at step S17. When the auxiliary parking braking controller 220 receives the activation signal from the VCU 120, the auxiliary parking braking controller 220 may be switched from the deactivation state to the activation state, and may send the activation state signal indicating that the auxiliary parking braking controller is in the activation state to the VCU 120 at step S18.

The VCU 120 is configured to determine that the auxiliary parking braking controller is in the activation state based on the received activation state signal, and then sends the parking request signal to the auxiliary parking braking controller 220 at step S19. When the auxiliary parking braking controller 220 receives the parking request signal from the VCU 120, the auxiliary parking braking controller 220 may manipulate the second MOC so that the vehicle is parked at step S20. Furthermore, after the auxiliary parking braking controller 220 manipulates the second MOC, the auxiliary parking braking controller 220 may send, to the VCU 120, the fastening or releasing state of the second MOC at the step S21.

According to an exemplary embodiment of the present disclosure, the parking state of the vehicle is displayed to the driver through the cluster at step S23.

The electronic parking braking system and the control method thereof according to various exemplary embodiments of the present disclosure omit the transmission parking configuration according to the related art, and mount the auxiliary MCU in the EPB to implement the redundancy of the MCU. In the EPB, two EPB MCUs are integrated into one IEB to implement controller redundancy. Furthermore, the controller redundancy, the power source redundancy and the WSS redundancy are also present, so redundancy is strengthened.

Both the EPB MCUs are connected to the first communication channel and the second communication channel to implement CAN redundancy. When the failure occurs in the first communication channel, the second communication channel can normally send a message.

The electronic parking braking system and the control method thereof according to various exemplary embodiments of the present disclosure also implement control logic redundancy. When the failure occurs in the main parking braking controller, the main parking braking controller is configured to send the failure signal to the VCU, and the VCU sends the parking request control signal to the auxiliary parking braking controller, and then the auxiliary parking braking controller is configured to control the MOC of the driving wheel in the activation state.

In various embodiments of the present disclosure, all possible combinations are not listed, but the representative aspects of the present disclosure are described, and the contents described In various embodiments may be applied independently or in two or more combinations.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may be configured to process data according to a program provided from the memory, and may be configured to generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the memory and the processor may be provided as one chip, or provided as separate chips.

In various exemplary embodiments of the present disclosure, the scope of the present disclosure includes software or machine-executable commands (e.g., an operating system, an application, firmware, a program, etc.) for enabling operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

In an exemplary embodiment of the present disclosure, the vehicle may be referred to as being based on a concept including various means of transportation. In some cases, the vehicle may be interpreted as being based on a concept including not only various means of land transportation, such as cars, motorcycles, trucks, and buses, that drive on roads but also various means of transportation such as airplanes, drones, ships, etc.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In the present specification, unless stated otherwise, a singular expression includes a plural expression unless the context clearly indicates otherwise.

In exemplary embodiments of the present disclosure, "at least one of A and B" may refer to "at least one of A or B" or "at least one of combinations of at least one of A and B". Furthermore, "one or more of A and B" may refer to "one or more of A or B" or "one or more of combinations of one or more of A and B".

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

According to an exemplary embodiment of the present disclosure, components may be combined with each other to be implemented as one, or some components may be omitted.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. An electronic parking braking (EPB) system comprising:
    a transmission apparatus configured to send a parking request signal when a parking (P) stage is input;
    a main parking braking controller configured to determine capability of performing a main parking braking control upon receiving the parking request signal from the transmission apparatus, perform the main parking braking control upon determining that the main parking braking controller is capable of performing the main parking braking control, and send a failure signal to the transmission apparatus upon determining that the main parking braking controller is not capable of performing the main parking braking control; and
    an auxiliary parking braking controller configured to perform an auxiliary parking braking control based on the parking request signal received from the transmission apparatus in an activation state,
    wherein the transmission apparatus is further configured to activate the auxiliary parking braking controller so that the auxiliary parking braking controller performs the auxiliary parking braking control upon receiving the failure signal from the main parking braking controller,
    wherein the main parking braking controller is further configured to:
    perform the main parking braking control by controlling operations of first and second calipers upon determining that the main parking braking control is capable of being performed, and
    send a feedback signal indicating states of the first and second calipers to a vehicle control unit in response that the main parking braking control is completed.

2. The electronic parking braking system of claim 1, wherein the transmission apparatus includes:
    a shift stage button configured to input a shift stage in response of manipulation of a driver, and
    the vehicle control unit configured to request a shift control of a vehicle based on the shift stage input into the shift stage button to send a shift request signal.

3. The electronic parking braking system of claim 2, wherein:
    the main parking braking controller is electrically connected to the vehicle control unit through a first communication channel and a second communication channel, and the auxiliary parking braking controller is electrically connected to the vehicle control unit through the first communication channel and the second communication channel, and
    in response that a communication failure occurs in the first communication channel, communication between the main parking braking controller and the vehicle control unit and communication between the auxiliary parking braking controller and the vehicle control unit are implemented through the second communication channel.

4. The electronic parking braking system of claim 3, further including:
    a first communication channel including a first CAN local network of a CAN network; and a second communication channel including a second CAN local network, a third CAN local network and a center gateway CGW of the CAN network.

5. The electronic parking braking system of claim 1, further including:
an EPB switch configured to input an electronic parking signal in response to the manipulation of the driver,
wherein the main parking braking controller is further configured to perform the main parking braking control by controlling operations of first and second calipers upon receiving the electronic parking signal input from the EPB switch.

6. The electronic parking braking system of claim 1, wherein the main parking braking controller and the auxiliary parking braking controller are provided in a same control apparatus.

7. The electronic parking braking system of claim 1, wherein the main parking braking controller and the auxiliary parking braking controller are provided in different control apparatuses.

8. An electronic parking braking (EPB) system comprising:
a transmission apparatus configured to send a parking request signal when a parking (P) stage is input;
a main parking braking controller configured to determine capability of performing a main parking braking control upon receiving the parking request signal from the transmission apparatus, perform the main parking braking control upon determining that the main parking braking controller is capable of performing the main parking braking control, and send a failure signal to the transmission apparatus upon determining that the main parking braking controller is not capable of performing the main parking braking control; and
an auxiliary parking braking controller configured to perform an auxiliary parking braking control based on the parking request signal received from the transmission apparatus in an activation state,
wherein the transmission apparatus is further configured to activate the auxiliary parking braking controller so that the auxiliary parking braking controller performs the auxiliary parking braking control upon receiving the failure signal from the main parking braking controller, and
wherein a vehicle control unit is configured to:
send an activation signal to the auxiliary parking braking controller to activate the auxiliary parking braking controller upon receiving the failure signal from the main parking braking controller, and
send the parking request signal to the auxiliary parking braking controller upon determining that the auxiliary parking braking controller is in the activation state.

9. The electronic parking braking system of claim 8, wherein the auxiliary parking braking controller is further configured to:
switch the auxiliary parking braking controller from a deactivation state to the activation state upon receiving the activation signal from the vehicle control unit, and
send, to the vehicle control unit, an activation state signal indicating that the auxiliary parking braking controller is in the activation state so that the vehicle control unit determines that the auxiliary parking braking controller is in the activation state based on the received activation state signal.

10. The electronic parking braking system of claim 9, wherein the auxiliary parking braking controller is further configured to:
perform the auxiliary parking braking control by controlling operation of one caliper upon receiving the parking request signal from the vehicle control unit in the activation state, and
send a feedback signal indicating a state of the one caliper to the vehicle control unit in response that the auxiliary parking braking control is completed.

11. A control method of an electronic parking braking (EPB) system, wherein the electronic parking braking system includes a shift stage button, a vehicle control unit, a main parking braking controller, and an auxiliary parking braking controller, the control method comprising:
sending, by the vehicle control unit, a parking request signal in response that a parking (P) stage is input into the shift stage button;
determining, by the main parking braking controller, capability of performing a main parking braking control upon receiving the parking request signal from the vehicle control unit, and sending, to the vehicle control unit, a failure signal upon determining that the main parking braking controller is not capable of performing the main parking braking control;
activating, by the vehicle control unit, the auxiliary parking braking controller upon receiving the failure signal from the main parking braking controller; and
performing, by the auxiliary parking braking controller, an auxiliary parking braking control upon receiving the parking request signal from the vehicle control unit in an activation state,
wherein the method further includes:
performing, by the main parking braking controller, the main parking braking control by controlling operations of first and second calipers upon determining that the main parking braking control is capable of being performed; and
sending, by the main parking braking controller, a feedback signal indicating states of the first and second calipers to the vehicle control unit in response that the main parking braking control is completed.

12. The control method of claim 11, further including:
sending, by the vehicle control unit, an activation signal to the auxiliary parking braking controller to activate the auxiliary parking braking controller upon receiving the failure signal from the main parking braking controller;
switching, by the auxiliary parking braking controller, from a deactivation state to the activation state upon receiving the activation signal from the vehicle control unit, and sending, to the vehicle control unit, an activation state signal indicating that the auxiliary parking braking controller is in the activation state; and
determining, by the vehicle control unit, that the auxiliary parking braking controller is in the activation state based on the received activation state signal, and sending, to the auxiliary parking braking controller, the parking request signal upon determining that the auxiliary parking braking controller is in the activation state.

13. The control method of claim 12, further including:
performing, by the auxiliary parking braking controller, an auxiliary parking braking control upon receiving the parking request signal from the vehicle control unit in the activation state by controlling an operation of one caliper; and
sending, by the auxiliary parking braking controller, a feedback signal indicating a state of the one caliper to the vehicle control unit in response that the auxiliary parking braking control is completed.

14. The control method of claim 11, wherein:
the main parking braking controller is electrically connected to the vehicle control unit through a first communication channel and a second communication channel, and the auxiliary parking braking controller is electrically connected to the vehicle control unit through the first communication channel and the second communication channel, and
in response that a communication failure occurs in the first communication channel, communication between the main parking braking controller and the vehicle control unit and communication between the auxiliary parking braking controller and the vehicle control unit are implemented through the second communication channel.

15. The control method of claim 14,
wherein the first communication channel includes a first CAN local network of a CAN network, and
wherein the second communication channel includes a second CAN local network, a third CAN local network and a CGW of the CAN network.

16. The control method of claim 11,
wherein the electronic parking braking system further includes an EPB switch, and
wherein the control method further includes,
receiving an electronic parking signal in response to manipulation of a driver through the EPB switch; and
performing, by the main parking braking controller, the main parking braking control by controlling operations of first and second calipers in response to receiving the electronic parking signal from the EPB switch.

17. The control method of claim 11, wherein the main parking braking controller and the auxiliary parking braking controller are provided in a same control apparatus.

18. The control method of claim 11, wherein the main parking braking controller and the auxiliary parking braking controller are provided in different control apparatuses.

* * * * *